United States Patent

Schenk et al.

[15] 3,638,053
[45] Jan. 25, 1972

[54] TERRAIN PROBE FOR SCANNING TIME BEHAVIOR OF STRESS WAVES IN A MEDIUM

[72] Inventors: Vladimir Schenk; Zdenek Pros; Ludvik Waniek, all of Prague, Czechoslovakia

[73] Assignee: Ceskoslovenska Akademie ved, Prague, Czechoslovakia

[22] Filed: Apr. 13, 1970

[21] Appl. No.: 27,851

[52] U.S. Cl. ................................310/8.3, 310/8.9, 310/9.1, 73/70, 340/17
[51] Int. Cl. ............................................................H01v 7/00
[58] Field of Search......................310/8.2, 8.3, 8.7, 8.9, 9.9, 310/9.4, 9.1; 340/10, 17; 73/70

[56] References Cited

UNITED STATES PATENTS

| | | | |
|---|---|---|---|
| 2,442,785 | 6/1948 | Shipiro et al. | 310/8.2 X |
| 2,775,434 | 12/1956 | Probst | 310/8.9 X |
| 2,799,788 | 7/1957 | Fitzgerald et al. | 310/8.3 |
| 2,875,352 | 2/1959 | Orlacchio | 310/9.1 X |
| 2,894,317 | 7/1959 | Marks | 310/8.7 X |
| 3,144,090 | 8/1964 | Mazzagatti et al. | 181/.5 |
| 3,145,311 | 8/1964 | Dickey | 310/8.7 X |
| 3,332,057 | 7/1967 | Pavey, Jr. | 340/17 |
| 3,336,573 | 8/1967 | Gallaway et al. | 71/11 |
| 3,374,663 | 3/1968 | Morris | 310/8.7 X |
| 3,378,705 | 4/1948 | Bacon | 310/8.2 X |

*Primary Examiner*—D. F. Duggan
*Assistant Examiner*—Mark O. Budd
*Attorney*—Arthur O. Klein

[57] ABSTRACT

A terrain probe for scanning time behavior of stress waves in a medium by means of a piezoelectric element mounted in a hollow tubular pointed body. More particularly a constructional arrangement to locate measuring elements for evaluating the stress waves propagating in a medium to be examined. The tubular body includes moreover an electric conductor attached to the piezoelectric element and adapted for transmitting pulses corresponding to the wave characteristics to a recording apparatus. The scanning sensitivity of the piezoelectric element is enhanced in that the frequency of the latter oscillating between the walls of the tubular body is more than two digits higher than the frequency of the waves to be examined.

4 Claims, 2 Drawing Figures

TERRAIN PROBE FOR SCANNING TIME BEHAVIOR OF STRESS WAVES IN A MEDIUM

BACKGROUND OF THE INVENTION

The present invention relates to a terrain probe for scanning time behavior of stress waves in a medium by means of a piezoelectric element, and more particularly to a constructional arrangement of measuring elements for evaluating the stress waves propagating in the medium to be examined.

It is already known to scan the time behavior of stress waves on the surface of a medium by means of various mechanical or piezoelectric probes. Such probes, however, cannot be used for scanning the behavior of stress waves in the interior of geological media. The aforementioned wave types are, for example, generated adjacent exploding charges of explosives, or as a result of strong mechanical shocks. The well-known probes of this type are designed for studying the characteristics of stress waves in both gaseous and liquid media.

Thus for instance an all-direction piezoelectric probe equipped with a tourmalin point has not found to be satisfactory for various soil types because of its poor mechanical resistance, and therefore it is only used in liquid media. Another unitary piezoelectric probe provided with a quartz plate is suitable solely for examining the magnitude of a bypassing wave in a gaseous medium. For scanning the time behavior of stress waves in the interior of solid media, there are already known probes designed for superficial measurements, such probes being inserted into prebored holes which are then backfilled with the excavated material. None of the aforementioned known probe types are capable of meeting adequately the criteria of accuracy, reliability and reproducibility of measurements which are sometimes required. Such shortcomings have an undesirable influence on the following examining processes.

The purpose of the present invention and the basic object of the same is to overcome the aforementioned disadvantages and to significantly improve the terrain probe for scanning time behavior of pressure and elastic waves in a medium.

SUMMARY OF THE INVENTION

In accordance with one feature of our invention we provide a terrain probe for scanning time behavior of stress waves in a medium by means of a piezoelectric element, which probe comprises a piezoelectric element mounted in the cavity of a support body and attached both to the inner wall thereof and to an electric conductor, such as a flexible cord, the cavity room above and below said piezoelectric element being filled with a solid elastic mass, such as epoxy-resin.

The thickness of the piezoelectric element in the support body is greater than the wall thickness of the support body, one of the extremities of said body being formed as a point.

The support body containing the piezoelectric element is shaped in the form of a tube to receive an electric cord, the space surrounding said cord in the tube being filled with a damping substance.

The mouth of the tube above the cord outlet is extended in the form of a projection, the point at the opposite end of the support body being adapted to be removed therefrom.

The natural frequency of the piezoelectric oscillating between the walls of the support body is of an order of magnitude substantially larger (more than two digits higher) than the frequency of the waves to be examined.

Due to its constructional simplicity, and by being mounted in a solid medium to be examined without drill work being necessary, and due to its operational reliability, the terrain probe according to the invention effects very precise measurements of the characteristics of stress waves.

The novel features which are considered as characteristic for the invention are set forth in particular in the appended claims. The invention itself, however, as both to its construction and its method of operation, together with additional objects and advantages thereof, will be best understood from the following description of a specific embodiment when read in connection with the accompanying drawings.

DESCRIPTION OF THE PREFERRED EMBODIMENT

Figure 1:
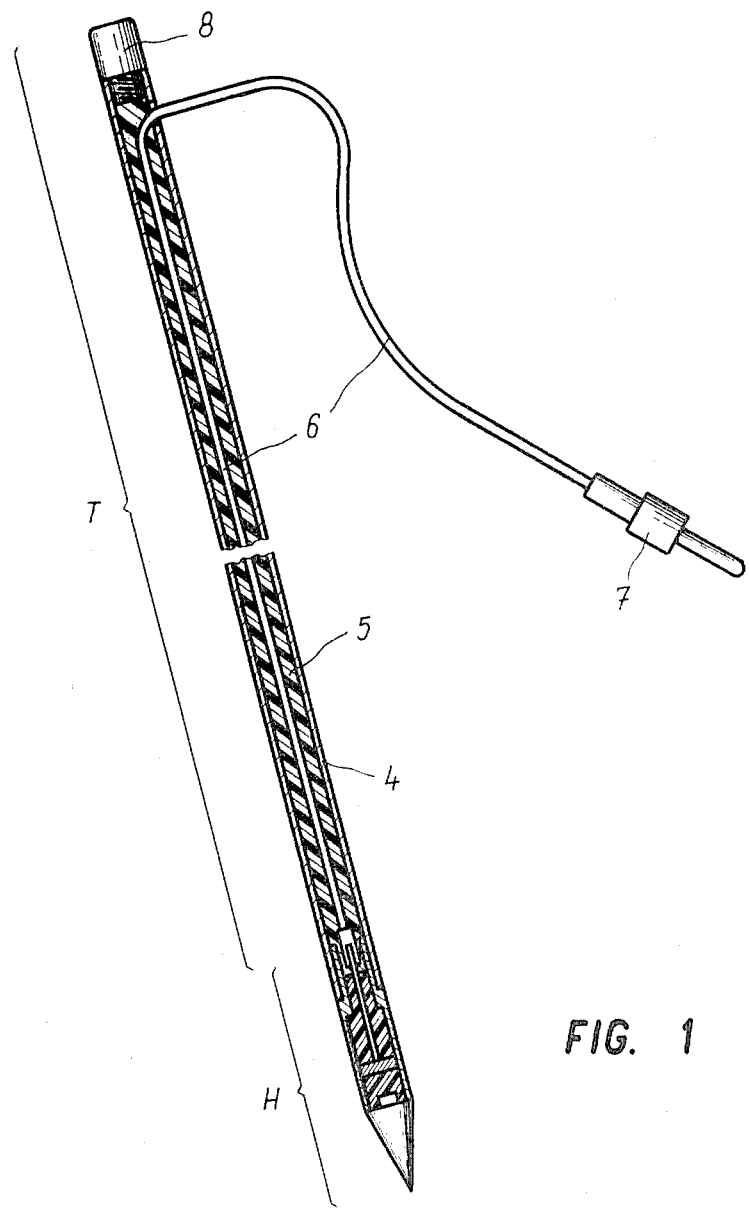
FIG. 1 is a schematic view of a terrain probe for scanning time behavior of stress waves in a medium, with parts in longitudinal section.
Figure 2:
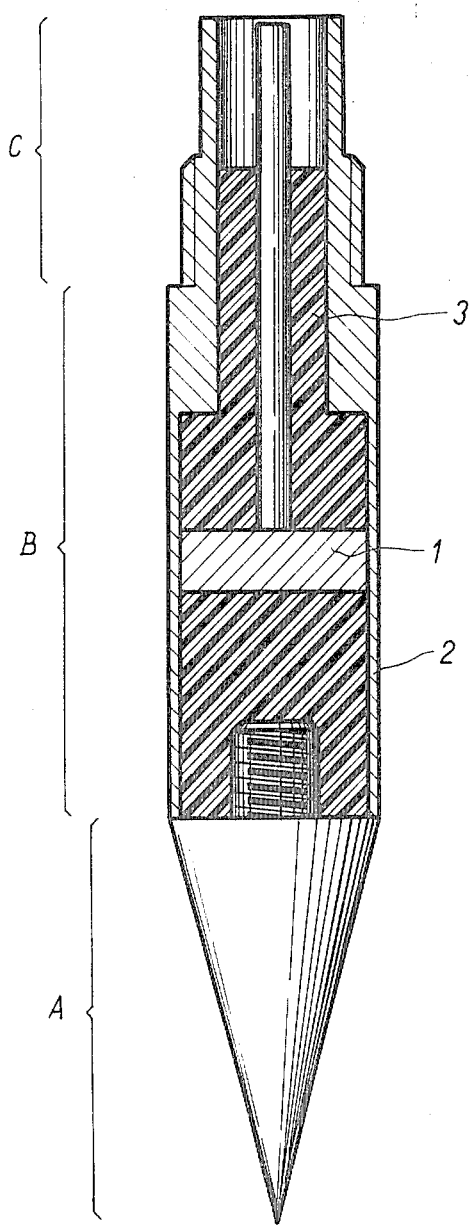
FIG. 2 is an enlarged detailed view of the support body of the probe showing the manner of mounting of the piezoelectric element in the interior of the lower pointed portion of the support body, the other extremity of the latter is adapted to be mounted in a rod containing the electric cord and is arranged as a coaxial connector.

Discussing now the drawing in detail, and firstly FIG. 1 thereof, it will be seen that the terrain probe according to the invention consists of two main parts, i.e., a rod T and a support body H. The support body H and the rod T are attached to each other by means of mating portions partly shown as a coaxial connector C (see FIG. 2). The support body H is extended in form of a point A, and above the latter is mounted a piezoelectric element 1 which is secured to the inner wall of the cylindrical portion of the support body H the bore of which above and below the piezoelectric element 1 is filled with a solid elastic mass. For the purpose of the invention this cavity may preferably be cast-in with epoxy-resin.

The thickness of the piezoelectric element 1 mounted in the support body H is preferably greater than that of the wall 2 of the cylindrical portion of the body H. The point A provided at one extremity of the supporting body H is removably mounted thereon, for example, by means of a threaded bolt connection. The support body above the portion in which the piezoelectric element 1 is mounted is shaped in the form of a tube 4 to receive an electric flexible conductor or cord 6 of which one end is attached to the piezoelectric element 1 while its other end is provided with a plug 7 to be connected to a socket in a recording apparatus not shown in the drawing. The portion of the tube 4 above the outlet of flexible conductor 6 is, formed as a projection 8. The space surrounding the conductor 6 in the interior of the tube 4 is filled with a damping substance, such as MOLITAN (Registered Trade Mark), designed to prevent the cord 6 from moving. For this purpose an antivibrating cord type is preferably to be used in order to prevent the transmittance of wave characteristics from the piezoelectric element 1 to the cable plug 7 from being distorted.

The measurement by means of the terrain probe according to the present invention is carried out as follows:

By applying blows on the projection 8 of the tube 4 with a nonillustrated instrument the support body H together with the piezoelectric element 1 is driven into the solid medium to be examined. In this way the probe is made ready for scanning. A stress wave generated in the soil for example by an explosion, is transmitted directly on to the wall 2 of the support body H and simultaneously to the piezoelectric element 1. An electric signal is produced by the piezoelectric element 1 due to the stress wave and is further transmitted via cord 6 to a recording apparatus (not shown) which should be adapted to the size of amplitudes and of frequency spectra of the waves to be examined. The actual frequency of the piezoelectric element 1 should amount to at least two digits more than the average prevailing frequency of the respective stress wave. The calibration of the scanner amplitude is carried out in a gaseous, or aqueous medium by means of standard charges on the basis of the well-known dependence of the amplitude upon the distance.

In thus carrying the terrain probe according to the present invention into practice there can be attained a high reliability of stress waves time behavior measurements, since the frequency of the piezoelectric element in the support body is more than two digits higher than that of stress waves to be measured so that the inertia of this highly sensitive piezoelectric element is negligible, and the time behavior of the stress wave can be recorded without any distortion. The construction of the scanning probe according to the invention is simple, mechanically resistant and inexpensive in manufacture. The insertion of the probe into the medium to be examined does not require preliminary drill work, so that the measuring process is, also from the economic standpoint, very interesting.

It will be understood that each of the elements described above, or two or more together may also find a useful application in other types of construction differing from the types described above.

While the invention has been illustrated and described as embodied in a terrain probe for scanning time behavior of stress waves in a medium by means of a piezoelectric element, it is not intended to be limited to the details shown, since various modifications and structural changes may be made without departing in any way from the spirit of the present invention.

Without further analysis, the foregoing will so fully reveal the fist of the present invention that others can, by applying current knowledge, readily adapt it for various applications without omitting features that from the standpoint of prior art clearly constitute essential characteristics of the generic or specific aspect of this invention and therefore, such adaptations should and are intended to be comprehended within the meaning and range of equivalence of the following claims.

What is claimed as new and desired to be protected by Letters Patent is set forth in the appended claims.

We claim:

1. A geological probing device for scanning the time behavior of stress waves in geological strata, comprising in combination, a first tubular metal housing adapted to receive stress waves travelling through said strata, a solid disc-shaped unitary piezoelectric element coaxially mounted in said first housing, the cylindrical wall of said piezoelectric element being in contact with the interior wall of said first tubular metal housing, a solidified elastomeric material at least completely filling the regions in the first housing at opposite sides of said piezoelectric element so as to maintain the latter in coaxial position with respect to said first housing, a penetrating member being operatively mounted at one end of said first housing, a second tubular housing being coaxially connected to said first tubular housing, an electrical conductor being connected to the center of said cylindrical unitary piezoelectric element and axially extending through said first and second tubular housings and being adapted to transmit electrical pulses from said piezoelectric element in accordance with stress waves received by it, the contact between the cylindrical wall of said piezoelectric element and said first tubular housing being adapted to form a grounded terminal, the thickness of said cylindrical unitary piezoelectric element being substantially larger than the thickness of the wall of said first tubular housing, said second tubular housing having impact receiving means at the end distant from said first tubular housing for driving said penetrating member into said geological strata, said second tubular housing being filled with a damping material surrounding said electrical conductor, and the piezoelectric element is so sized and selected that its natural frequency is larger by at least an order of magnitude of two digits with respect to the stress waves to be scanned by the probing device.

2. The geological probing device as set forth in claim 1, wherein said solidified elastomeric material consists of epoxy-resin.

3. The geological probing device as set forth in claim 1, wherein said electrical conductor terminates in an electrical plug to be inserted in an electrical recording device.

4. The geological probing device as set forth in claim 1, wherein said penetrating member is metallic and conically shaped and is coaxially mounted on said first tubular housing.

* * * * *